UNITED STATES PATENT OFFICE.

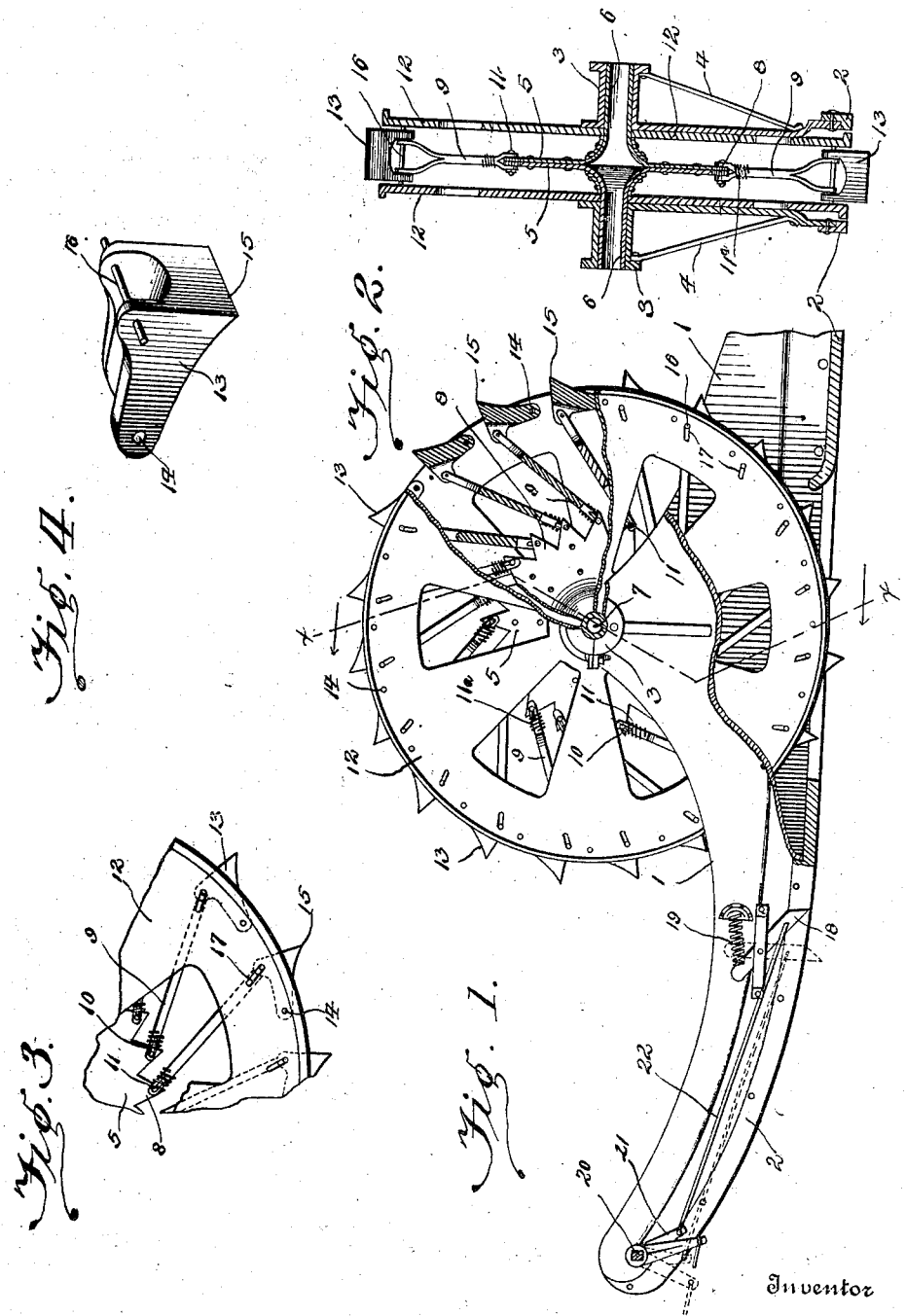

MARTIN OLSON, OF COEUR D'ALENE, IDAHO.

AUTOMOBILE SLEIGHING ATTACHMENT.

1,006,265.      Specification of Letters Patent.      Patented Oct. 17, 1911.

Application filed June 4, 1910. Serial No. 564,994.

*To all whom it may concern:*

Be it known that I, MARTIN OLSON, a citizen of the United States, residing at Coeur d'Alene, in the county of Kootenai and State of Idaho, have invented new and useful Improvements in Automobile Sleighing Attachments, of which the following is a specification.

The present invention provides means whereby a mechanically propelled vehicle may be readily converted into a sleigh, said means embodying a runner, a propeller and a brake.

A further purpose of the invention is the provision of a propeller of unique formation embodying a driver, a guide and a series of yieldable dogs, which, when the propeller is in operation, are caused to take hold of the surface over which the sleigh or machine may be gliding and which dogs when the machine is at rest are withdrawn, the dogs yielding when meeting with a nonyielding object or spot in the surface so as to prevent injury or a disabling of the propeller.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a side view of a runner and propeller embodying the invention. Fig. 2 is a transverse section on the line *x—x* of Fig. 1. Fig. 3 is a detail view of a portion of the propeller. Fig. 4 is a detail perspective view of one of the dogs.

Corresponding and like parts are referred to in the following description, and indicated in all the views of the drawing, by the same reference characters.

The runner comprises side portions 1, which are transversely spaced and a tread portion 2 connecting the lower edges of the side portions 1. The side portions 1 of the runner slope upwardly intermediate of their ends and terminate in hubs 3, which are adapted to receive the axle upon which the propeller is mounted. Braces 4 are interposed between the outer ends of the hubs 3 and the lower portions of the side members 1 and serve to strengthen and stay the outer ends of the hubs. The runner may be constructed in any manner and preferably consists of separate pieces rigidly connected, the bottom 2 being formed independently of the side members 1.

The driver is formed of two disks 5 which are placed together and secured in any manner, either by bolts or rivets. Hubs 6 project outwardly from the disks 5 and fit loosely within the hubs 3 of the runner and are adapted to be secured to the axle 7 so as to rotate therewith. The driver is provided around its outer edge with points 8 to which bars 9 are connected in a manner to have a limited pivotal and longitudinal movement. The bars 9 have their inner ends forked and the forked members provided with longitudinal slots 10 through which pins 11 pass, said pins being supported in openings formed in the projections 8. Springs 11ª mounted upon the inner ends of the bars 9 have their outer ends connected with said bars and their inner ends abutting against the points 8, said springs exerting an outward pressure on the bars to yieldingly hold the dogs 13 in operative position.

A guide is loosely mounted upon the hubs 6 of the driver and is formed of two plates or circular members 12 which are transversely spaced and have the driver arranged between them. The circular plates or members 12 support dogs 13, which are pivoted at 14 thereto, the opposite ends of the dogs having a limited play so as to be projected beyond the outer edges of the members 12 or to be withdrawn within the plane of said outer edges. The dogs 13 are of U-form in cross section and are mounted upon bolts or pins 14, which also serve to connect the outer edge portions of the members 12. The swinging ends of the dogs 13 are widened and are formed with biting edges 15, which are of chisel form so as to make positive engagement with the slippery surface over which the machine equipped with the propeller may be gliding. The outer ends of the bars 9 are pivotally connected to the dogs by means of pins or bolts 16 which pass through slots 17 formed in the outer edge portions of the members 12, thereby admitting of the swinging ends of the dogs 13 moving so as to occupy a position within the plane of the outer edges of the guide or to be projected beyond the outer edges of said guide. The outer ends of the bars 9 are forked and receive the pins or bolts 16. The bars 9 have an approximate tangential arrangement; and a turning movement of the driver independently of the guide causes the active ends of the dogs 13 either to be projected or retracted. When the driver is rotated forwardly the bars 9 are pushed outwardly and project the biting edges of the dogs 13, whereby they engage the icy surface and impart a positive propelling movement to the vehicle. When the propelling force is cut off the guide moves backward by the action of the springs 11, thereby withdrawing the biting edges of the dogs 13. This enables the machine to coast.

The brake consists of a dog 18 pivoted intermediate of its ends to the runner. A spring 19 coöperates with the dog 18 to hold the same out of action. A rock shaft 20 is provided with an arm 21, which is connected by means of a rod 22 with the dog 18, so that when the rock shaft 20 is turned in one direction the dog 18 is projected beyond the lower face of the runner to bite into the surface and bring the machine to rest. The rock shaft 20 may be operated in any manner.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof; I desire to have it understood that the device shown is merely illustrative, and that such changes may be made when desired as are within the scope of the claims appended hereto.

Having thus described the invention what is claimed as new, is:—

1. In combination a driver of approximately circular form having oppositely extending hubs, a guide comprising circular members spaced apart and loosely mounted upon the hubs of the driver with the latter between them, the guide members having transversely alining slots extending in a substantially radial direction, dogs arranged between the members of the guide and pivoted at one end thereto, and connecting means between the opposite end of each of the dogs and the driver.

2. In combination, a driver having oppositely extending hubs, a guide comprising circular members arranged upon opposite sides of the driver and mounted loosely upon the hubs thereof and having transversely alined slots in their outer portions extending substantially in radial lines, dogs arranged between the outer portions of the guide members and pivoted at one end thereto, rods connecting the free ends of the dogs with the driver and having a limited longitudinal play to admit of swinging inward and outward movement of the dogs, and springs connecting the rods with the driver and serving to yieldingly press the dogs outwardly when the driver rotates forwardly.

3. In combination a driver having oppositely extending hubs, a guide comprising circular members loosely mounted upon the hubs of the driver and having slots in their outer portions extending approximately in radial lines, dogs of approximately U-form pivoted at one end to the guide members and having the opposite end widened to form biting edges, rods connected at their inner ends to the driver to have a pivotal and a longitudinal movement, and pins connecting the outer ends of the rods with the dogs and passing through the beforementioned slots in the outer portions of the guide members.

4. In combination a runner embodying side portions provided with outwardly extending hubs, a driver of circular form having hub portions mounted in the hubs of the runner, a guide formed of circular members loosely mounted upon the hubs of the driver and having transversely alined slots in their outer portions extending approximately in radial lines, dogs located between the outer portions of the guide members and pivoted at one end thereto, rods pivotally connected at their inner ends to the driver and having a limited longitudinal movement, pins pivotally connecting the dogs to said rods and having their end portions extending into the slots in the outer portions of the guide members, and springs mounted upon the rods and connecting them with the driver.

In testimony whereof I affix my signature in presence of two witnesses.

MARTIN OLSON.

Witnesses:
F. W. FITZE,
ARTHUR BOST.